United States Patent
Seki et al.

(10) Patent No.: US 11,820,015 B2
(45) Date of Patent: Nov. 21, 2023

(54) OVERSHOOT AMOUNT DETECTION METHOD AND ROBOT SYSTEM

(71) Applicant: Seiko Epson Corporation, Tokyo (JP)

(72) Inventors: Ryutaro Seki, Shiojiri (JP); Atsushi Toyofuku, Shiojiri (JP); Tomonori Mano, Shiojiri (JP)

(73) Assignee: SEIKO EPSON CORPORATION

( * ) Notice: Subject to any disclaimer, the term of this patent is extended or adjusted under 35 U.S.C. 154(b) by 181 days.

(21) Appl. No.: 17/377,547

(22) Filed: Jul. 16, 2021

(65) Prior Publication Data

US 2022/0016769 A1  Jan. 20, 2022

(30) Foreign Application Priority Data

Jul. 17, 2020 (JP) .................................. 2020-122675

(51) Int. Cl.
  *B25J 9/16* (2006.01)
  *B25J 13/08* (2006.01)
(52) U.S. Cl.
  CPC ........... *B25J 9/1638* (2013.01); *B25J 9/1692* (2013.01); *B25J 13/088* (2013.01)
(58) Field of Classification Search
  CPC ...... B25J 9/1638; B25J 9/1692; B25J 13/088; B25J 9/1674; B25J 9/1602; B25J 9/1664; B25J 9/1694; B25J 9/0087; B25J 13/006; G05B 2219/40228; G05B 2219/41145; G05B 2219/42213; G05B 1/03; G05B 15/02; G05B 2219/39241; G05D 19/02
  See application file for complete search history.

(56) References Cited

U.S. PATENT DOCUMENTS

| 9,527,275 B1* | 12/2016 | Flannigan | ............... B41J 25/308 |
| 11,187,793 B1* | 11/2021 | Liu | ....................... G05D 1/0088 |
| 2007/0288124 A1* | 12/2007 | Nagata | .................... B25J 13/088 |
| | | | 901/46 |
| 2013/0278196 A1 | 10/2013 | Tian | |

(Continued)

FOREIGN PATENT DOCUMENTS

| CN | 109104259 A | 12/2018 |
| JP | 2011-136395 A | 7/2011 |

(Continued)

*Primary Examiner* — Jonathan L Sample
*Assistant Examiner* — Byron Xavier Kasper
(74) *Attorney, Agent, or Firm* — Harness, Dickey & Pierce, P.L.C.

(57) ABSTRACT

An overshoot amount detection method includes a synchronization step of synchronizing a signal of an inertial sensor with a signal of an encoder based on a first synchronizing signal output from the inertial sensor during a signal synchronizing operation and a second synchronizing signal output from the encoder during the signal synchronizing operation, a signal generation step of generating a first signal by twice integration of a first detection signal output from the inertial sensor during a working operation and removal of a low-frequency component contained in the first detection signal and generating a second signal for supplement of the low-frequency component of the first signal from a second detection signal output from the encoder during the working operation, and an overshoot amount detection step of detecting an overshoot amount of an arm based on the first signal and the second signal.

5 Claims, 5 Drawing Sheets

(56) References Cited

U.S. PATENT DOCUMENTS

| | | | |
|---|---|---|---|
| 2014/0309778 A1 | 10/2014 | Asada | |
| 2015/0246442 A1 | 9/2015 | Cho et al. | |
| 2018/0207797 A1* | 7/2018 | Yamaoka | B25J 9/1694 |
| 2019/0291279 A1 | 9/2019 | Nakayama et al. | |
| 2019/0308316 A1* | 10/2019 | Washizu | B25J 9/1664 |
| 2019/0344440 A1* | 11/2019 | Yamaoka | B25J 9/1674 |
| 2022/0016769 A1 | 1/2022 | Seki et al. | |

FOREIGN PATENT DOCUMENTS

| | | |
|---|---|---|
| JP | 2015-163416 A | 9/2015 |
| JP | 2018-118353 A | 8/2018 |

* cited by examiner

OVERSHOOT AMOUNT DETECTION METHOD AND ROBOT SYSTEM

The present application is based on, and claims priority from JP Application Serial Number 2020-122675, filed Jul. 17, 2020, the disclosure of which is hereby incorporated by reference herein in its entirety.

BACKGROUND

1. Technical Field

The present disclosure relates to an overshoot amount detection method and a robot system.

2. Related Art

A robot control system disclosed in JP-A-2018-118353 has an acceleration sensor provided in an end effector and detects an overshoot amount from a set stop position of an arm based on a detection signal output from the acceleration sensor. Specifically, the robot control system detects a position of the arm by twice integration of an acceleration signal as the detection signal output from the acceleration sensor, and detects the maximum value of a difference between the detected position and the set stop position as the overshoot amount.

When the acceleration signal output from the acceleration sensor is integrated twice, drift occurs due to noise, and it is necessary to remove a low-frequency component signal contained in the acceleration signal from the signal when the integration is performed by filtering processing or the like. However, the low-frequency component is an important component indicating the movement of the arm, and there is a problem that, if the low-frequency component is removed, accurate detection of overshoot amount of the arm is difficult.

SUMMARY

An overshoot amount detection method according to an aspect of the present disclosure is an overshoot amount detection method of detecting an overshoot amount of an arm to be displaced, including a synchronization step of controlling the arm to perform a signal synchronizing operation, and synchronizing a signal of an inertial sensor with a signal of an encoder based on a first synchronizing signal output from the inertial sensor that detects inertia in a working unit of the arm during the signal synchronizing operation and a second synchronizing signal output from the encoder that detects an amount of displacement of the arm during the signal synchronizing operation, a signal generation step of controlling the arm to perform a working operation, and generating a first signal by twice integration of a first detection signal output from the inertial sensor during the working operation and removal of a low-frequency component contained in the first detection signal and generating a second signal for supplement of the low-frequency component of the first signal from a second detection signal output from the encoder during the working operation, and an overshoot amount detection step of detecting the overshoot amount of the arm based on the first signal and the second signal.

A robot system according to an aspect of the present disclosure includes an arm to be displaced, an inertial sensor that detects inertia in a working unit of the arm, an encoder that detects an amount of displacement of the arm, and an overshoot amount detection unit that performs a synchronization step of controlling the arm to perform a signal synchronizing operation and synchronizing a signal of the inertial sensor with a signal of the encoder based on a first synchronizing signal output from the inertial sensor during the signal synchronizing operation and a second synchronizing signal output from the encoder during the signal synchronizing operation, a signal generation step of controlling the arm to perform a working operation, and generating a first signal by twice integration of a first detection signal output from the inertial sensor during the working operation and removal of a low-frequency component contained in the first detection signal and generating a second signal for supplement of the low-frequency component of the first signal from a second detection signal output from the encoder during the working operation, and an overshoot amount detection step of detecting an overshoot amount of the arm based on the first signal and the second signal.

DESCRIPTION OF EXEMPLARY EMBODIMENTS

Figure 1:
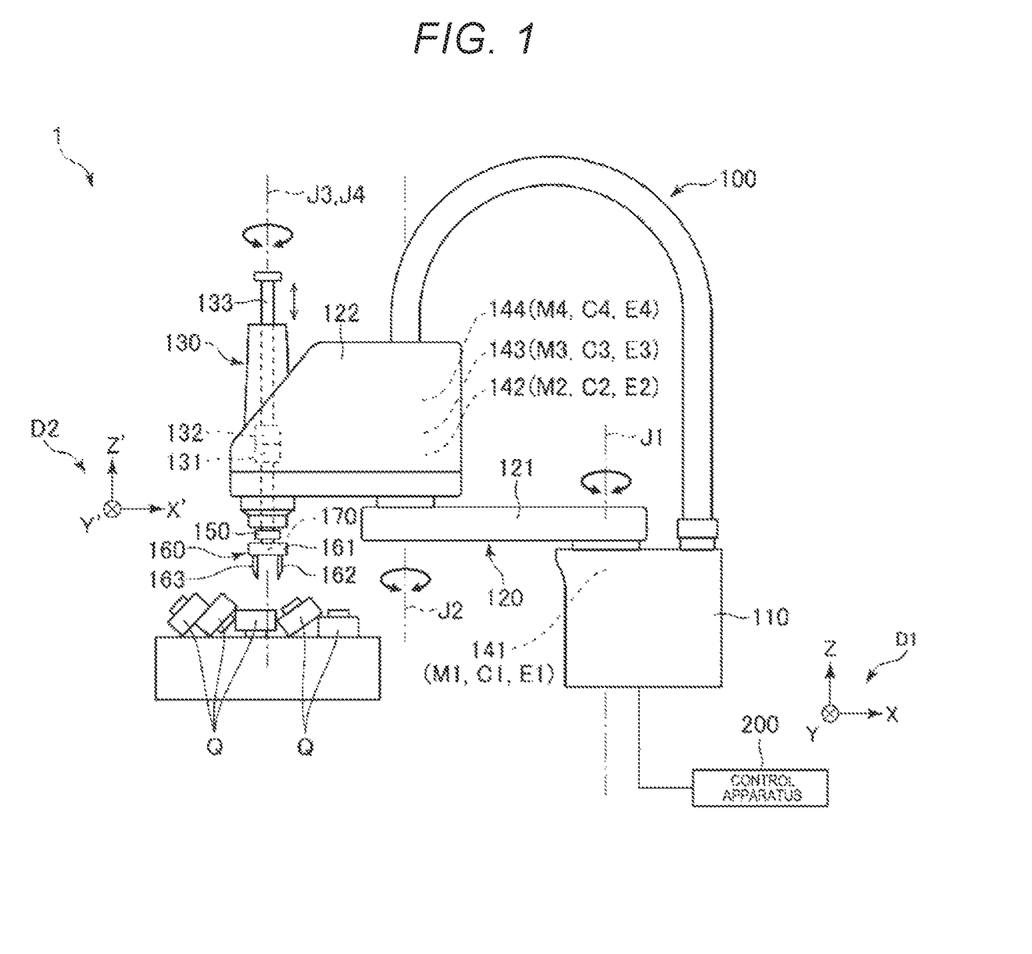
FIG. 1 shows an overall configuration of a robot system according to a preferred embodiment of the present disclosure.
Figure 2:
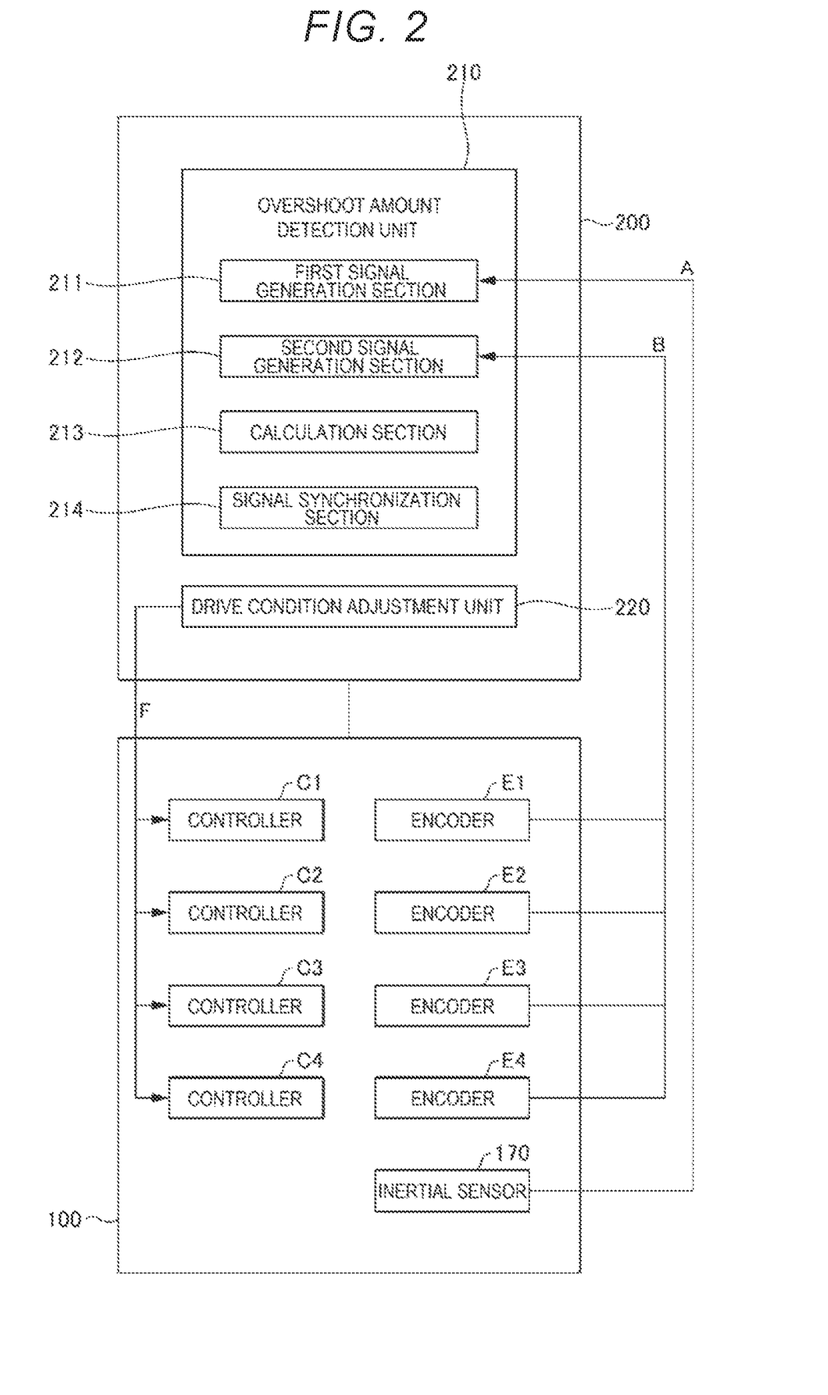
FIG. 2 is a block diagram showing a configuration of a control apparatus.
Figure 3:
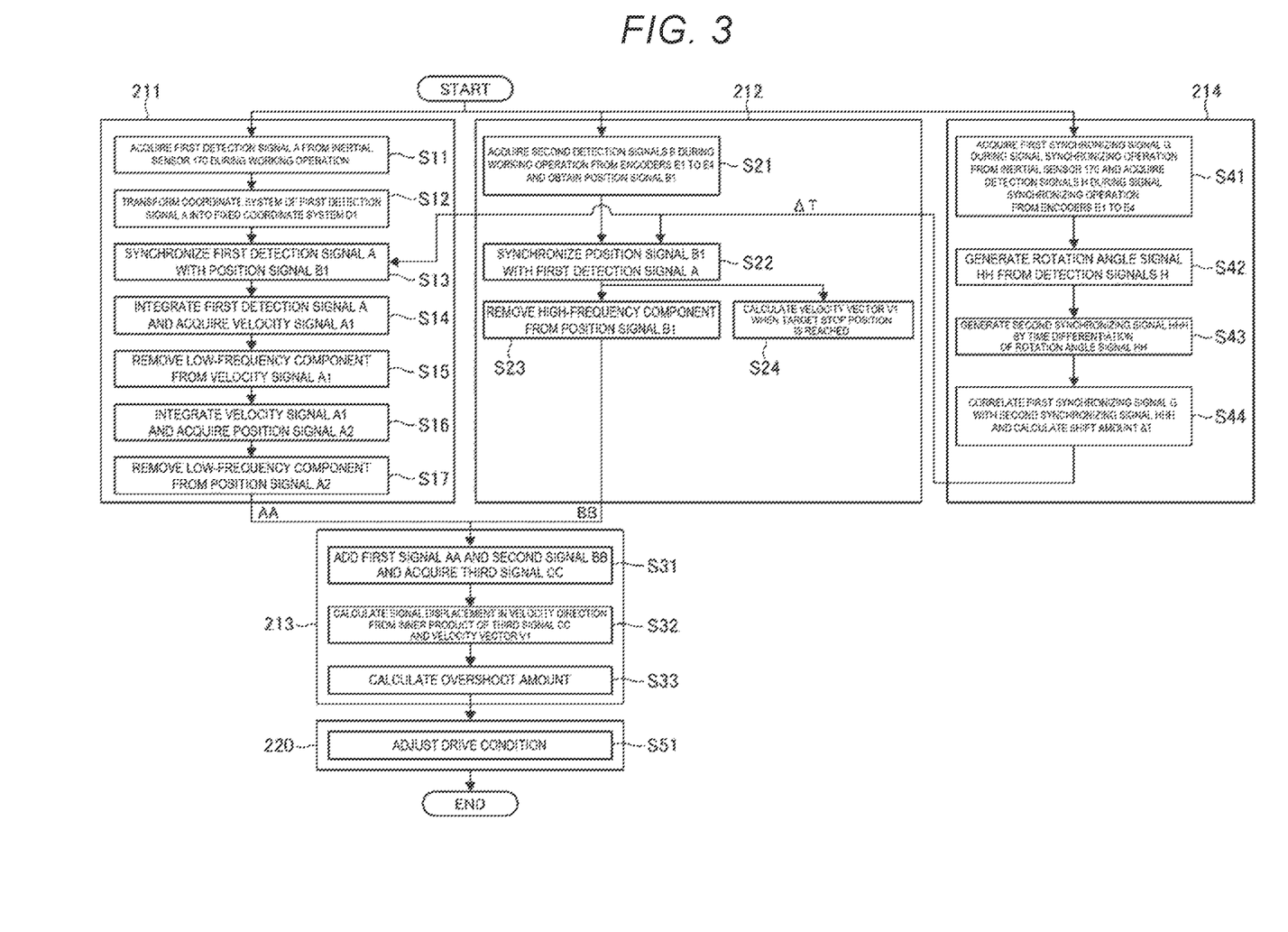
FIG. 3 is a flowchart showing an overshoot amount detection method.
Figure 4:
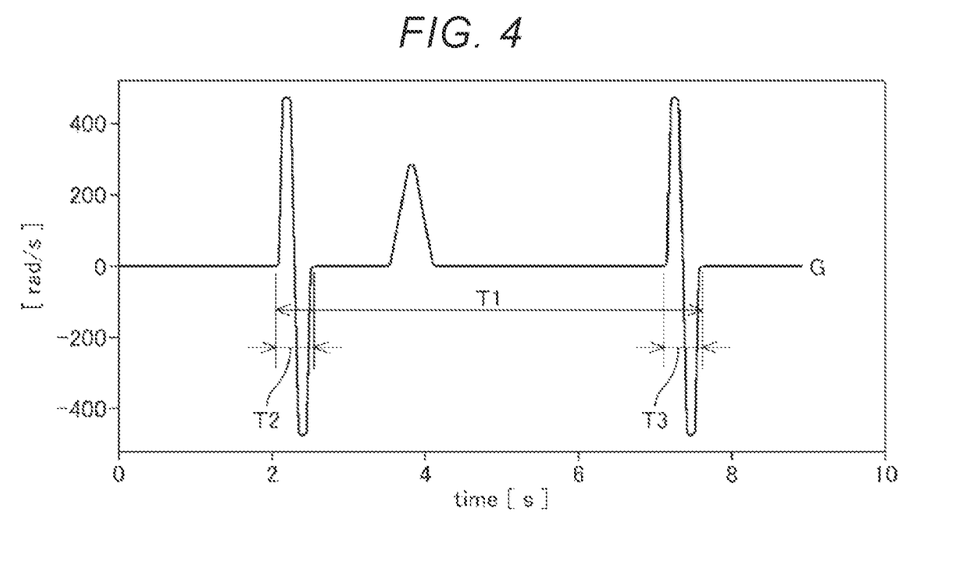
FIG. 4 is a graph showing an example of a first synchronizing signal.
Figure 5:
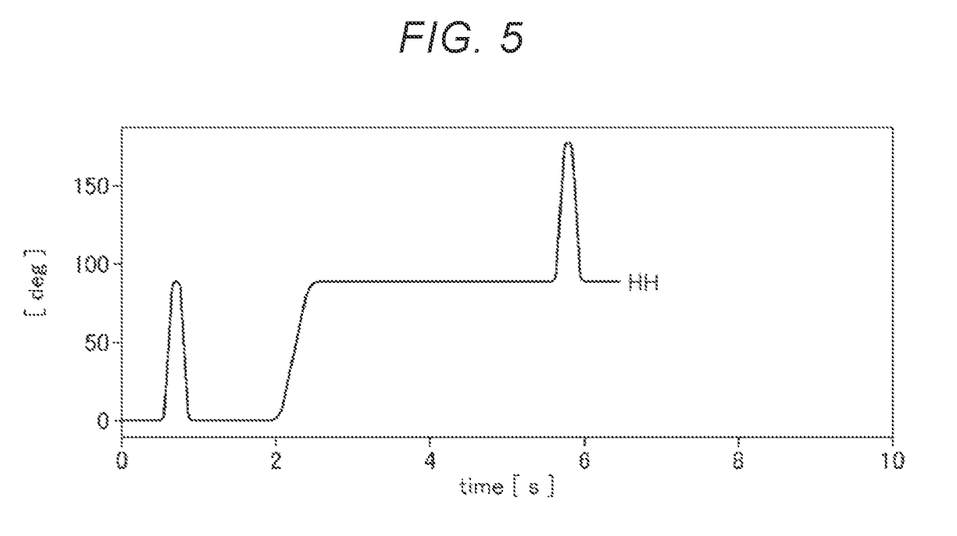
FIG. 5 is a graph showing an example of a rotation angle signal.
Figure 6:
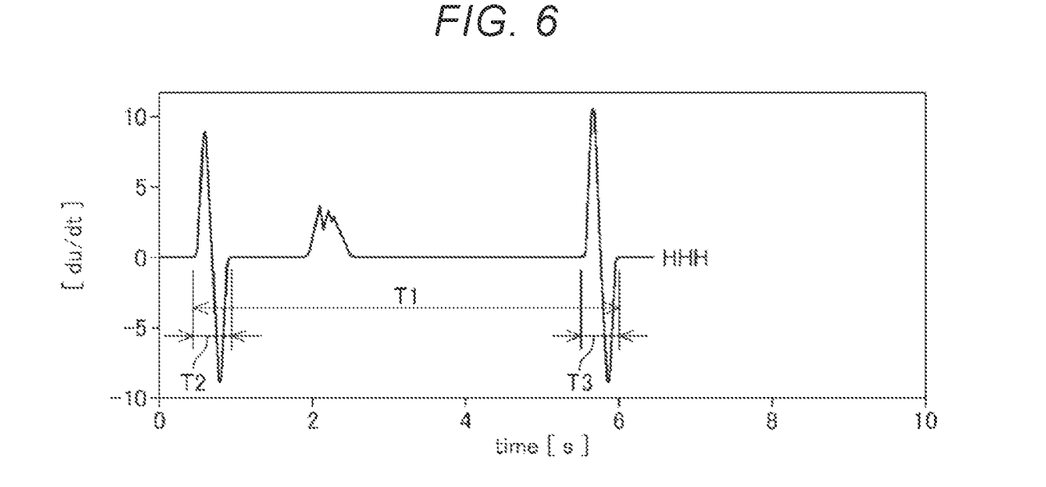
FIG. 6 is a graph showing a second synchronizing signal obtained by time differentiation of the rotation angle signal in FIG. 5.

As below, an overshoot amount detection method and a robot system according to the present disclosure will be explained in detail based on an embodiment shown in the accompanying drawings. FIG. 1 shows an overall configuration of a robot system according to a preferred embodiment of the present disclosure. FIG. 2 is a block diagram showing a configuration of a control apparatus. FIG. is a flowchart showing an overshoot amount detection method. FIG. 4 is a graph showing an example of a first synchronizing signal. FIG. 5 is a graph showing an example of a rotation angle signal. FIG. 6 is a graph showing a second synchronizing signal obtained by time differentiation of the rotation angle signal in FIG. 5.

A robot system 1 shown in FIG. 1 has a robot main body 100 and a control apparatus 200 that controls driving of the robot main body 100.

First, the robot main body 100 is briefly explained. The robot main body 100 is a horizontal articulated robot (scalar robot) and used for respective work of e.g. holding, transport, assembly, inspection, etc. of workpieces including electronic components. Note that the usage of the robot main body 100 is not particularly limited.

The robot main body 100 has a base 110 and an arm 120 coupled to the base 110. The arm 120 has a first arm 121 with a proximal end portion coupled to the base 110 pivotable about a first axis J1 relative to the base 110, and a second arm 122 with a proximal end portion coupled to a distal end portion of the first arm 121 pivotable about a second axis J2 parallel to the first axis J1 relative to the first arm 121. Further, a working head 130 is provided in a distal end portion of the second arm 122.

The base 110 is fixed to e.g. a floor surface (not shown) by bolts or the like. Within the base 110, a driver 141 that pivots the first arm 121 about the first axis J1 along a vertical direction relative to the base 110 is provided and, within the second arm 122, a driver 142 that pivots the second arm 122 about the second axis J2 relative to the first arm 121 is provided.

The driver 141 includes a motor M1 as a drive source that pivots the first arm 121 about the first axis J1 relative to the base 110, a controller C1 that controls driving of the motor M1, an encoder E1 that detects an amount of displacement (pivot angle) of the first arm 121 about the first axis J1, etc. Similarly, the driver 142 includes a motor M2 as a drive source that pivots the second arm 122 about the second axis J2 relative to the first arm 121, a controller C2 that controls driving of the motor M2, an encoder E2 that detects an amount of displacement (pivot angle) of the second arm 122 about the second axis J2, etc.

The working head 130 has a spline nut 131 and a ball screw nut 132 coaxially placed in the distal end portion of the second arm 122, and a spline shaft 133 inserted through the spline nut 131 and the ball screw nut 132. The spline shaft 133 is a center shaft for the second arm 122, and movable upward and downward in directions along a third axis J3 parallel to the first, second axes J1, J2 and rotatable about a fourth axis J4 aligned with the third axis J3.

As described above, the robot main body 100 has the four drive axes of the first axis J1, the second axis J2, the third axis J3, and the fourth axis J4.

Within the second arm 122, a driver 143 that moves the spline shaft 133 upward and downward in the directions along the third axis J3 by rotating the ball screw nut 132 and a driver 144 that rotates the spline shaft 133 about the fourth axis J4 by rotating the spline nut 131 are provided.

The driver 143 includes a motor M3 as a drive source that moves the spline shaft 133 upward and downward in the third axis J3 directions relative to the second arm 122, a controller C3 that controls driving of the motor M3, an encoder E3 that detects an amount of displacement (amount of elevation) of the spline shaft 133 in the third axis J3 directions, etc. Similarly, the driver 144 includes a motor M4 as a drive source that pivots the spline shaft 133 about the fourth axis J4 relative to the second arm 122, a controller C4 that controls driving of the motor M4, an encoder E4 that detects an amount of displacement (pivot angle) of the spline shaft 133 about the fourth axis J4, etc.

Here, the respective encoders E1 to E4 have a common fixed coordinate system D1. The fixed coordinate system D1 has an X-axis, a Y-axis, and a Z-axis orthogonal to one another and the X-axis and the Y-axis extend in the horizontal directions and the Z-axis extends in the vertical directions. The fixed coordinate system D1 is fixed relative to the base 110, and accordingly, the position thereof is fixed regardless of the displacement of the arm 120.

A payload 150 for attachment of an end effector 160 as a working unit is provided in a lower end portion of the spline shaft 133. The end effector 160 attached to the payload 150 is not particularly limited as long as the end effector may perform a target operation. In the embodiment, a hand for gripping an object Q is used. Note that the gripping method is not particularly limited. The hand may hold the object by a plurality of claws or suction the object by air chuck, electrostatic chuck, or the like.

The end effector 160 of the embodiment has a base portion 161 attached to the payload 150 and a pair of claw portions 162, 163 openable and closable relative to the base portion 161. The pair of claw portions 162, 163 are brought closer to each other, and thereby, may grip the object Q. The claw portions 162, 163 are separated from each other, and thereby, may release the gripped object Q. Note that the configuration of the end effector 160 is not particularly limited.

Further, the robot main body 100 has an inertial sensor 170 provided in the base portion 161 of the end effector 160. The inertial sensor 170 is an inertial measurement unit (IMU) that may respectively independently detect accelerations in three axial directions orthogonal to one another and angular velocities about three axes. The inertial sensor 170 has a movable coordinate system D2. The movable coordinate system D2 has an X'-axis, a Y'-axis, and a Z'-axis orthogonal to one another and the X'-axis and the Y'-axis extend in the horizontal directions and the Z'-axis extends in the vertical directions. The movable coordinate system D2 is fixed relative to the base portion 161 and, when the base portion 161 moves or pivots in the X-axis directions, the Y-axis directions, or the Z-axis directions, moves or pivots with the motion and, when the base portion 161 rotates about the third axis J3, rotates with the motion.

As described above, the inertial measurement unit that can measure accelerations and angular velocities is used as the inertial sensor 170, and thereby, movement and vibration of the arm 120 may be detected for both translational motion (linear motion) without rotation and rotational motion without translational motion.

As above, the overall configuration of the robot main body 100 is briefly explained. Note that the configuration of the robot main body 100 is not particularly limited, but, for example, the arm 120 may have a configuration in which the first arm 121 is omitted and the second arm 122 is coupled to the base 110 or a configuration in which at least one arm rotatable about an axis parallel to the first, second axes J1, J2 further intervenes between the first arm 121 and the second arm 122. Or, not the horizontal articulated robot, but an articulated robot including a six-arm robot or dual-arm robot in which rotation axes of a plurality of arms have a skew relationship may be employed.

For example, the control apparatus 200 controls driving of the drivers 141, 142, 143, 144 according to commands from a host computer (not shown). The control apparatus 200 includes e.g. a computer having a processor (CPU) that processes information, a memory communicably coupled to the processor, and an external interface. Further, various programs that can be executed by the processor are stored in the memory and the processor may read and execute various programs stored in the memory etc.

As shown in FIG. 2, the control apparatus 200 has an overshoot amount detection unit 210 that detects an overshoot amount of the arm 120, and a drive condition adjustment unit 220 that adjusts a drive condition of the arm 120 based on a detection result in the overshoot amount detection unit 210. Note that the overshoot amount of the arm 120 is the maximum value of an excessive amount of the arm 120 relative to a target stop position when the arm 120 is moved to the target stop position.

The overshoot amount detection unit 210 has a function of detecting the overshoot amount of the arm 120. Specifically, the overshoot amount of the arm 120 of the embodiment refers to an overshoot amount of the base portion 161 of the end effector 160 as the working unit. The base portion 161 is provided sufficiently close to the claw portions 162, 163 that grip the object Q, i.e., the working unit of the robot main body 100. Accordingly, the overshoot amount of the portion is detected, and thereby, the overshoot amount in the working unit may be detected more accurately. Then, using the detection result, the trajectory of the end effector 160 may be controlled more accurately and, as a result, working accuracy and working efficiency of the robot main body 100 are respectively improved.

The overshoot amount detection unit 210 has a first signal generation section 211 that acquires a first detection signal A output from the inertial sensor 170 and generates a first signal AA from the acquired first detection signal A, a second signal generation section 212 that acquires second detection signals B output from the respective encoders E1 to E4 and generates a second signal BB from the acquired second detection signals B, a signal synchronization section 214 that synchronizes the first signal AA with the second signal BB, and a calculation section 213 that generates a third signal CC by adding the first signal AA and the second signal BB and calculates the overshoot amount of the arm 120 based on the third signal CC.

As above, the robot system 1 is briefly explained. Next, an overshoot amount detection method by the robot system 1 is explained. The overshoot amount detection method has a synchronization step of controlling the arm 120 to perform a signal synchronizing operation and synchronizing signals output from the inertial sensor 170 and the encoders E1 to E4 during the signal synchronizing operation based on these signals, a signal generation step of controlling the arm 120 to perform a working operation and generating the first signal AA and the second signal BB based on the signals output from the inertial sensor 170 and the encoders E1 to E4 during the working operation, an overshoot amount detection step of detecting the overshoot amount of the arm 120 based on the first signal AA and the second signal BB, and a drive condition adjustment step of adjusting the drive condition of the arm 120 based on the overshoot amount calculated at the overshoot amount detection step.

Prior to the description of the synchronization step, the signal generation step and the overshoot amount detection step will be explained according to a flowchart shown in FIG. 3. At the signal generation step and the overshoot amount detection step, the overshoot amount when the robot system 1 performs the working operation is detected. The working operation refers to various operations performed on the object Q including transport, machining, and inspection of the object Q and requiring the detection of the overshoot amount of the arm 120 for increase in accuracy. In other words, the working operation refers to all operations for which a user desires to detect the overshoot amount.

First, processing of the first signal generation section 211 at the signal generation step is explained. As step S11, the first signal generation section 211 first acquires the first detection signal A as an acceleration signal output from the inertial sensor 170 during the working operation. Then, as step S12, the first signal generation section 211 transforms the movable coordinate system D2 as the coordinate system of the first detection signal A acquired from the inertial sensor 170 into the fixed coordinate system D1 as the coordinate system of the encoders E1 to E4. The transformation may be performed using e.g. a homogeneous transformation matrix. In this manner, the movable coordinate system D2 as the coordinate system of the first detection signal A is transformed into the fixed coordinate system D1 as the coordinate system of the encoders E1 to E4 so that the coordinate systems of the first detection signal A and the second detection signals B may coincide, and thereby, the overshoot amount of the arm 120 may be accurately calculated from the subsequent third signal CC.

Then, as step S13, the first signal generation section 211 synchronizes the first detection signal A with the second detection signals B, specifically, a position signal B1, which will be described later. Thereby, the subsequent third signal CC may be generated more accurately. The synchronizing method will be described in detail in the part of explanation of the synchronization step.

Then, the first signal generation section 211 integrates the first detection signal A twice and removes a low-frequency component from the first detection signal A. Specifically, as step S14, the first signal generation section 211 first integrates the first detection signal A and obtains a velocity signal A1. Then, as step S15, the first signal generation section 211 removes a low-frequency component from the velocity signal A1 using a high-pass filter or the like. Then, as step S16, the first signal generation section 211 integrates the velocity signal A1 and obtains a position signal A2. Then, as step S17, the first signal generation section 211 removes a low-frequency component from the position signal A2 using a high-pass filter or the like. Thereby, the first signal AA is obtained.

The low-frequency components removed at steps S15, S17 refer to components in lower frequency bands of the frequency bands of the signals, not components having absolute frequency bands. For example, in normal actuation of the robot main body 100, the frequency band of the first detection signal A is about from 1 Hz to 100 Hz and, for example, components equal to or lower than 10 Hz are preferably set as the low-frequency components.

The low-frequency component is removed from the first detection signal A for the following reason. As described above, it is known that the velocity signal A1 is obtained by the single integration of the first detection signal A as the acceleration signal, and the position signal A2 is obtained by the twice integration. Accordingly, the position of the base portion 161 of the end effector 160 can be detected from the position signal A2. However, in the position signal obtained by twice integration of the first detection signal A, noise at lower frequencies is emphasized. Accordingly, detection of the accurate position of the base portion 161 is difficult from the position signal obtained only by twice integration of the first detection signal A.

For that reason, to remove the above described noise, it is necessary to remove the low-frequency component from the first detection signal A. Note that the timing and the number of times to remove the low-frequency component from the first detection signal A are not particularly limited. For example, one of the steps S15, S17 may be omitted. Or, the steps S15, S17 may be omitted and the low-frequency component may be removed from the first detection signal A prior to step S14 instead.

As described above, the low-frequency component is removed from the first detection signal A and the noise is removed from the position signal A2, however, the removed low-frequency component is an important signal indicating the movement of the arm 120. That is, when the low-frequency component is removed from the first detection signal A, not only the noise but also the important signal indicating the movement of the arm 120 is removed. Accordingly, it is difficult to detect the accurate position of the base portion 161 of the end effector 160 even based on the position signal A2 after the removal of the low-frequency component. On this account, the second signal generation section 212 generates the second signal BB for supplement of the low-frequency component removed from the first detection signal A.

Next, processing of the second signal generation section 212 at the signal generation step is explained. As step S21, the second signal generation section 212 first acquires the second detection signals B output from the respective encoders E1 to E4 during the working operation and obtains the position signal B1 of the base portion 161 of the end effector 160 from these respective second detection signals B. Then, as step S22, the second signal generation section 212 synchronizes the position signal B1 with the first detection signal A. This step is the same step as the above described step S13 and will be described in detail in the part of explanation of the synchronization step. Then, as step S23, the second signal generation section 212 removes a high-frequency component from the position signal B1 using a low-pass filter or the like. Thereby, the second signal BB for supplement of the low-frequency component removed from the first signal AA is obtained.

It is preferable that, as the high-frequency component removed at step S23, the frequency band of the second signal BB contains the frequency band removed from the first signal AA. Thereby, the low-frequency component removed from the first signal AA may be supplemented by the second signal BB. As described above, in the embodiment, the low-frequency component equal to or lower than 10 Hz is removed from the first signal AA, and it is preferable that the second signal BB contains the low-frequency component from 0 Hz to 10 Hz. In other words, at step S23, it is preferable to set the low-pass filter to remove the frequency components higher than 10 Hz.

Further, as step S24 separate from step S23, the second signal generation section 212 calculates a velocity vector V1 when the arm 120 reaches the target stop position based on a position command from the host computer (information on the target stop position of the arm 120) and the position signal B1.

As above, the signal generation step is explained. Next, processing of the calculation section 213 at the overshoot amount detection step is explained. As step S31, the calculation section 213 first adds the first signal AA and the second signal BB synchronized with each other and obtains the third signal CC. The third signal CC is a signal formed by supplementation of the low-frequency component of the first signal AA with the second signal BB and a synthesized signal indicating a three-dimensional movement trajectory of the base portion 161 of the end effector 160. Here, the first signal AA and the second signal BB are synchronized at the above described steps S13, S22, and thereby, the accurate third signal CC without a time lag is synthesized.

Then, as step S32, the calculation section 213 calculates an inner product of the velocity vector V1 and the third signal CC and calculates signal displacement in the velocity direction, i.e., the movement direction of the base portion 161. Then, as step S33, the calculation section 213 calculates the overshoot amount of the base portion 161 based on the signal displacement calculated at step S32. Specifically, the calculation section 213 calculates a peak value (maximum value) of the signal displacement as the overshoot amount of the base portion 161.

As above, the overshoot amount detection step is explained. Next, a method of synchronizing the first detection signal A with the position signal B1 at steps S13, S22 will be explained. To synchronize the first detection signal A with the position signal B1 at steps S13, S22, in the embodiment, before steps S13, S22, a synchronization step of calculating a shift amount ΔT from the first detection signal A to the position signal B1 is performed. Then, at steps S13, S22, the first detection signal A and the position signal B1 are shifted by the shift amount ΔT calculated at the synchronization step, and thereby, the first detection signal A and the position signal B1 are synchronized. As below, processing of the signal synchronization section 214 at the synchronization step will be explained according to the flowchart shown in FIG. 3.

As step S41, the signal synchronization section 214 first acquires a first synchronizing signal G as an angular velocity signal about the Z-axis output from the inertial sensor 170 during the signal synchronizing operation and acquires detection signals H output from the encoders E1 to E4 during the signal synchronizing operation.

Note that the signal synchronizing operation is an operation for controlling the robot main body 100 to synchronize the first detection signal A with the position signal B1. The signal synchronizing operation may be performed at least before or after the above described working operation and, in the embodiment, is performed both before and after the working operation. The signal synchronizing operation is not particularly limited, but may be any operation using at least one axis of the four drive axes of the arm 120, i.e., the first axis J1, the second axis J2, the third axis J3, and the fourth axis J4. When there is a drive axis not used in the above described working operation of the axes, it is preferable that the signal synchronizing operation is an operation using the unused drive axis. For example, when the working operation is the pivot about the first axis J1, the signal synchronizing operation may be a combination of one, two, or more of the pivot about the second axis J2 of the second arm 122 and the pivot about the fourth axis J4 and the movement in the third axis J3 direction of the spline shaft 133. Thereby, vibrations of the signal synchronizing operation and the working operation are harder to affect each other. That is, the signal synchronizing operation using the axis not the axis used in the working operation may be regarded as a different operation from the working operation.

In other words, when the signal synchronizing operation is performed before the working operation, the influence on the working operation by the residual vibration of the signal synchronizing operation may be reduced. Accordingly, accuracy of the working operation may be improved. Further, the time after the end of the signal synchronizing operation before the start of the working operation may be shortened, and the time for synchronization, i.e., the delay time for work by the synchronization step may be further shortened. On the other hand, when the signal synchronizing operation is performed after the working operation, the influence on the signal synchronizing operation by the residual vibration of the working operation may be reduced. Accordingly, accuracy of the signal synchronizing operation may be improved. Further, the time after the end of the working operation before the start of the signal synchronizing operation may be shortened, and the time for synchronization may be further shortened.

Note that, hereinafter, for convenience of explanation, the working operation is the pivot about the first axis J1 of the first arm 121 and the signal synchronizing operation is the pivot about the fourth axis J4 of the spline shaft 133.

Then, as step S42, the signal synchronization section 214 generates a rotation angle signal HH about the Z-axis of the end effector 160 as the working unit based on the detection signals H output from the encoders E1 to E4. As examples, FIGS. 4 and 5 show the first synchronizing signal G and the rotation angle signal HH when the signal synchronizing operation is performed before and after the working operation and the working operation is a reciprocating operation for 90 degrees about the first axis J1 and the respective signal synchronizing operations are reciprocating operations for 90 degrees about the fourth axis J4.

Then, as step S43, the signal synchronization section 214 generates a second synchronizing signal HHH as an angular velocity signal about the Z-axis by time differentiation of the rotation angle signal HH (dHH/dt). As an example, FIG. 6 shows the second synchronizing signal HHH acquired by time differentiation of the rotation angle signal HH shown in FIG. 5. Thereby, the first synchronizing signal G as the angular velocity signal about the Z-axis acquired from the inertial sensor 170 and the second synchronizing signal HHH as the angular velocity signal about the Z-axis acquired from the encoders E1 to E4 are acquired. Then, as step S44, the signal synchronization section 214 correlates the first synchronizing signal G with the second synchronizing signal HHH and calculates a shift amount ΔT (time difference) having the maximum correlation coefficient.

Note that the method of correlating the first synchronizing signal G with the second synchronizing signal HHH is not particularly limited. For example, the signals in an area T1 in FIGS. 4 and 6, that is, immediately before the start of the previous signal synchronizing operation and immediately after the subsequent signal synchronizing operation may be correlated, the signals in an area T2, i.e., during the previous signal synchronizing operation, or the signals in an area T3, i.e., during the subsequent signal synchronizing operation may be correlated. When the signals are correlated in both the area T2 and the area T3 and the shift amounts ΔT calculated therefrom are different from each other, one of the shift amounts ΔT may be used or an average value of the amounts may be used as the shift amount ΔT. Or, when the shift amounts ΔT are apart by a threshold value or more, the shift amount ΔT is not accurately calculated, and the above described steps S41 to 44 may be performed again and the shift amount ΔT may be recalculated.

As above, the synchronization step is explained. At steps S13, S22, the first detection signal A and the position signal B1 are synchronized based on the shift amount ΔT calculated at the synchronization step in the above described manner. That is, the first detection signal A and the position signal B1 are shifted by the shift amount ΔT calculated at the synchronization step. Thereby, at step S31, the third signal CC with higher accuracy may be obtained and the overshoot amount may be calculated with higher accuracy.

Note that, in the embodiment, the first detection signal A and the position signal B1 are synchronized at steps S13, S22, however, the time to synchronize is not particularly limited, but may be any time before the first detection signal A and the second signal BB are added at step S31. For example, steps S13, S22 may be omitted and the first detection signal A and the second signal BB may be synchronized based on the shift amount ΔT calculated at the synchronization step.

As above, the overshoot amount detection unit 210 is explained. According to the overshoot amount detection unit 210, the overshoot amount is calculated based on the third signal CC generated by addition of the second signal BB generated from the second detection signals B output from the respective encoders E1 to E4 for supplement of the low-frequency component removed from the first signal AA to the first signal AA generated from the first detection signal A output from the inertial sensor 170 without the low-frequency component containing higher noise. Since the low-frequency component of the second signal BB contains lower noise than the low-frequency component removed from the first detection signal A, the overshoot amount of the arm 120 is calculated based on the third signal CC, and thereby, for example, compared to a case where the overshoot amount of the arm 120 is detected based on a signal obtained only by twice integration of the first detection signal A without removal of the low-frequency component as in related art, the overshoot amount of the arm 120 may be detected more accurately. Note that the noise of the low-frequency component of the second signal BB is lower than the noise of the low-frequency component removed from the first detection signal A because the second signal BB is not subjected to integration processing like the first signal AA.

Further, the position of the base portion 161 may be calculated in consideration of both the position change of the arm 120 made by driving of the motors M1 to M4 and vibration (acceleration) generated in the base portion 161 with the change, and thus, the three-dimensional trajectory of the base portion 161 may be calculated more accurately. Only the trajectory of the base portion 161 in the traveling direction may be extracted and the overshoot amount of the base portion 161 may be accurately calculated in any traveling direction regardless of the placement orientation of the inertial sensor 170 relative to the base portion 161. Particularly, the calculation is based on the second detection signals B output from the encoders E1 to E4, and thereby, the traveling direction of the base portion 161 may be accurately detected regardless of residual vibration when the base portion 161 is at rest.

Next, the drive condition adjustment step is explained. As step S51, the drive condition adjustment unit 220 adjusts the drive condition of the arm 120 based on the overshoot amount calculated at step S33. Specifically, the drive condition of the arm 120 is adjusted so that the overshoot amount detected by the overshoot amount detection unit 210 may be smaller, preferably zero.

The adjustable drive condition is not particularly limited to, but includes e.g. (1) an acceleration immediately after the start of driving of the arm 120, (2) a velocity of movement at a constant velocity after acceleration, i.e., the maximum velocity, (3) a position in which deceleration is started for stopping in a target position, (4) a deceleration at the deceleration, etc. At least one of these condition (1) to condition (4) is appropriately adjusted and the overshoot amount is suppressed to be smaller, and thereby, the movement accuracy of the arm 120 becomes higher and the working efficiency becomes higher. Specifically, to minimize the overshoot amount, the drive amount of at least one of the motors M1 to M4 is adjusted for execution. That is, the drive condition adjustment unit 220 outputs a command signal F with addition of a correction value corresponding to the overshoot amount to the controllers C1 to C4 corresponding to the motors M1 to M4 to adjust, and adjusts the drive amounts and drive times of the corresponding motors M1 to M4. Note that the adjustment may be manually performed by a user. Or, step S51 may be omitted.

As above, the robot system 1 and the overshoot amount detection method are explained. The robot system 1 includes the arm 120 to be displaced, the inertial sensor 170 that detects inertia in the working unit of the arm 120, the encoders E1 to E4 that detect the amount of displacement of the arm 120, and the overshoot amount detection unit 210 that performs the synchronization step of controlling the arm 120 to perform the signal synchronizing operation and synchronizing the signal of the inertial sensor 170 with the signals of the encoders E1 to E4 based on the first synchronizing signal G output from the inertial sensor 170 during the signal synchronizing operation and the second synchronizing signal HHH output from the encoders E1 to E4 during the signal synchronizing operation, the signal generation step of controlling the arm 120 to perform the working operation, and generating the first signal AA by twice integration of the first detection signal A output from the inertial sensor 170 during the working operation and removal of the low-frequency component contained in the first detection signal A and generating the second signal BB for supplement of the low-frequency component of the first signal AA from the second detection signals B output from the encoders E1 to E4, and the overshoot amount detection step of detecting the overshoot amount of the arm 120 based on the first signal AA and the second signal BB.

Further, as described above, the overshoot amount detection method is the overshoot amount detection method of detecting the overshoot amount of the arm 120 to be displaced, including the synchronization step of controlling the arm 120 to perform the signal synchronizing operation and synchronizing the signal of the inertial sensor 170 with the signals of the encoders E1 to E4 based on the first synchronizing signal G output from the inertial sensor 170 detecting the inertia in the working unit of the arm 120 during the signal synchronizing operation and the second synchronizing signal HHH output from the encoders E1 to E4 detecting the amount of displacement of the arm 120 during the signal synchronizing operation, the signal generation step of controlling the arm 120 to perform the working operation, and generating the first signal AA by twice integration of the first detection signal A output from the inertial sensor 170 during the working operation and removal of the low-frequency component contained in the first detection signal A and generating the second signal BB for supplement of the low-frequency component of the first signal AA from the second detection signals B output from the encoders E1 to E4 during the working operation, and the overshoot amount detection step of detecting the overshoot amount of the arm 120 based on the first signal AA and the second signal BB.

According to the robot system 1 and the overshoot amount detection method, the overshoot amount is calculated based on the third signal CC generated by addition of the second signal BB with lower noise than that of the low-frequency component removed from the first signal AA to the first signal AA from which the low-frequency component with higher noise is removed. Accordingly, the overshoot amount is calculated based on the third signal CC, and thereby, compared to the case where the overshoot amount is detected based on the signal obtained only by twice integration of the first detection signal A without removal of the low-frequency component as in related art, the overshoot amount may be accurately detected. Particularly, the first signal AA and the second signal BB may be accurately synchronized, and the accuracy may be further improved.

Further, the position of the end effector 160 may be calculated in consideration of both the position change of the arm 120 provided by the motors M1 to M4 and vibration (acceleration) generated in the base portion 161 with the change, and thus, the three-dimensional trajectory of the end effector 160 may be calculated more accurately. Only the trajectory of the end effector 160 in the traveling direction may be extracted and the overshoot amount may be accurately calculated in any traveling direction regardless of the placement orientation of the inertial sensor 170. Particularly, the calculation is based on the second detection signals B output from the encoders E1 to E4, and thereby, the traveling direction of the end effector 160 may be accurately detected regardless of residual vibration when the end effector 160 is at rest.

As described above, the signal synchronizing operation is performed at least before or after the working operation. Thereby, the influence on the working operation by the residual vibration of the signal synchronizing operation may be reduced.

Further, as described above, the signal synchronizing operation is the different operation from the working operation. Thereby, vibrations of the signal synchronizing operation and the working operation are harder to affect each other.

As described above, the arm 120 has the first axis J1, the second axis J2, the third axis J3, and the fourth axis J4 as the plurality of drive axes, and the signal synchronizing operation is the operation using the drive axis not used in the working operation. Thereby, the vibrations of the signal synchronizing operation and the working operation are harder to affect each other.

As described above, at the synchronization step, the first synchronizing signal G and the second synchronizing signal HHH are correlated and the signal from the inertial sensor 170 and the signals from the encoders E1 to E4 are synchronized based on the shift amount ΔT having the maximum correlation coefficient. Thereby, the signal from the inertial sensor 170 and the signals from the encoders E1 to E4 may be accurately synchronized.

As above, the overshoot amount detection method and the robot system according to the present disclosure are explained based on the illustrated embodiments, however, the present disclosure is not limited to those. The configurations of the respective parts may be replaced by arbitrary configurations having the same functions. Or, another arbitrary configuration may be added.

In the above described embodiment, the signal synchronizing operation is the pivot motion about the fourth axis J4 of the spline shaft 133, however, the signal synchronizing operation is not limited to the rotational motion, but may be translational motion. That is, the signal synchronizing operation may be translational motion in the X-axis directions, translational motion in the Y-axis directions, translational motion in the Z-axis directions, or the like of the end effector 160 as the working unit. For example, when the signal synchronizing operation is translational motion in the X-axis directions, at the synchronization step, the acceleration signal in the X-axis directions output from the inertial sensor 170 and the position signal generated based on the signals output from the encoders E1 to E4 are correlated, and thereby, the shift amount ΔT may be calculated. That is, for calculation of the shift amount ΔT, it is unnecessary to use the angular velocity signal and the rotation angle signal as those in the above described embodiment. Accordingly, for example, an acceleration sensor may be used as the inertial sensor 170 in place of the IMU and the configuration of the inertial sensor 170 may be simplified.

What is claimed is:
1. An overshoot amount detection method of detecting an overshoot amount of an arm to be displaced, comprising:
controlling the arm to perform a signal synchronizing operation;
obtaining a first synchronizing signal output from an inertial sensor that detects inertia in a working unit of the arm during the signal synchronizing operation;

obtaining a second synchronizing signal output from an encoder that detects an amount of displacement of the arm during the signal synchronizing operation;

calculating a shift amount between the first and second synchronization signals at a time of a same action of the arm performed during the signal synchronizing operation, the shift amount corresponding to a time difference between the first and second synchronization signals at the time of the same action of the arm;

synchronizing a signal of the inertial sensor with a signal of the encoder based on the shift amount;

controlling the arm to perform a working operation;

generating a first signal by twice integration of a first detection signal output from the inertial sensor during the working operation and removal of a low-frequency component contained in the first detection signal;

generating a second signal for supplement of the low-frequency component of the first signal from a second detection signal output from the encoder during the working operation; and detecting the overshoot amount of the arm based on the first signal and the second signal.

2. The overshoot amount detection method according to claim 1, wherein the signal synchronizing operation is performed at least before or after the working operation.

3. The overshoot amount detection method according to claim 1, wherein the signal synchronizing operation is a different operation from the working operation.

4. The overshoot amount detection method according to claim 3, wherein the arm has a plurality of drive axes, and the signal synchronizing operation is an operation using the drive axis not used in the working operation.

5. A robot system comprising:

an arm to be displaced;

an inertial sensor that detects inertia in a working unit of the arm;

an encoder that detects an amount of displacement of the arm;

a memory configured to store a program; and a processor configured to execute the program so as to:

control the arm to perform a signal synchronizing operation;

obtain a first synchronizing signal output from the inertial sensor during the signal synchronization operation;

obtain a second synchronizing signal from the encoder during the signal synchronizing operation;

calculate a shift amount between the first and second synchronization signals at a time of a same action of the arm performed during the signal synchronizing operation, the shift amount corresponding to a time difference between the first and second synchronization signals at the time of the same action of the arm;

synchronize a signal of the inertial sensor with a signal of the encoder based on the shift amount;

control the arm to perform a working operation;

generate a first signal by twice integration of a first detection signal output from the inertial sensor during the working operation and removal of a low-frequency component contained in the first detection signal;

generate a second signal for supplement of the low-frequency component of the first signal from a second detection signal output from the encoder during the working operation; and detect an overshoot amount of the arm based on the first signal and the second signal.

\* \* \* \* \*